R. M. DIXON.

GENERATOR SUSPENSION.

APPLICATION FILED FEB. 26, 1917.

Reissued June 19, 1917.

14,317.

2 SHEETS—SHEET 1.

Inventor

Robert M. Dixon

By his Attorneys

Emery, Booth, Janney & Varney

R. M. DIXON.

GENERATOR SUSPENSION.

APPLICATION FILED FEB. 26, 1917.

Reissued June 19, 1917.

14,317.

2 SHEETS—SHEET 2.

Robert M. Dixon Inventor

By his Attorneys

Emery, Booth, Janney & Varney

UNITED STATES PATENT OFFICE.

ROBERT M. DIXON, OF EAST ORANGE, NEW JERSEY, ASSIGNOR TO SAFETY CAR HEATING & LIGHTING COMPANY, A CORPORATION OF NEW JERSEY.

GENERATOR SUSPENSION.

14,317. Specification of Reissued Letters Patent. Reissued June 19, 1917.

Original No. 1,167,389, dated January 11, 1916, Serial No. 609,055, filed February 16, 1911. Application for reissue filed February 26, 1917. Serial No. 151,123.

*To all whom it may concern:*

Be it known that I, ROBERT M. DIXON, a citizen of the United States, residing at East Orange, in the county of Essex and State of New Jersey, have invented certain new and useful Improvements in Generator Suspension, of which the following is a full, clear, and exact description, such as will enable others skilled in the art to which it appertains to make and use the same.

This invention relates to the mounting of generators to be driven from car-axles.

One of the objects of the invention is to provide a practical and efficient device of the character described in which the parts are readily assembled and securely held in position and are adapted to give an even and reliable drive to the generator.

Another object of the invention is to provide a device of the character described which shall be compact, cheap, and simple in construction, and readily adjustable to meet various conditions of use.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

Figure 1:
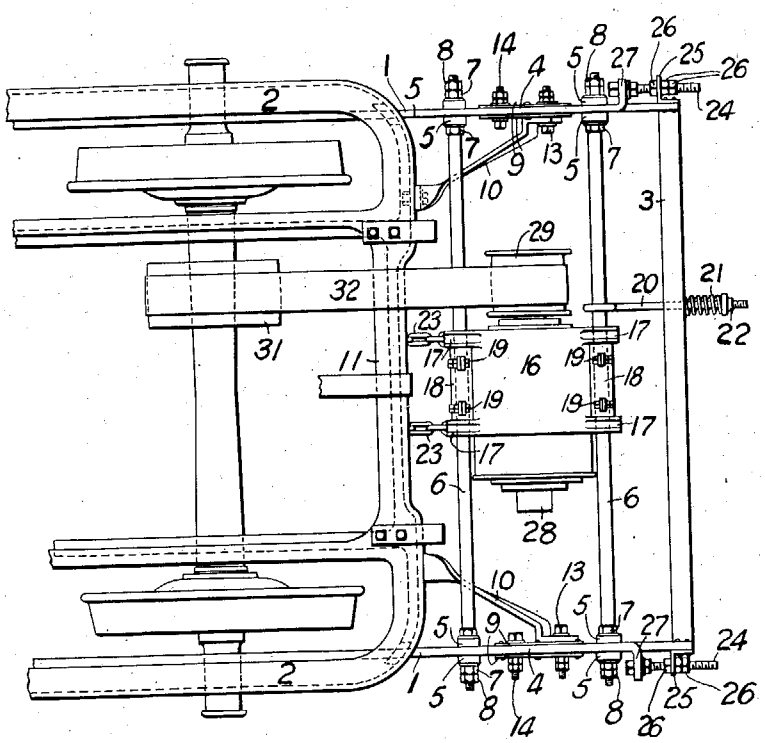
Figure 2:
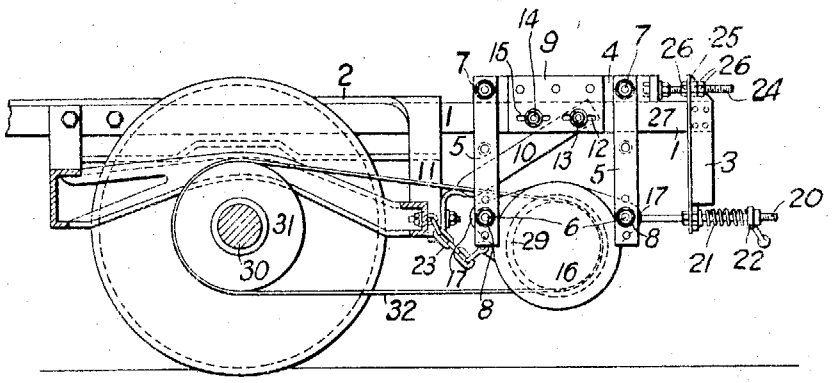
Figure 3:
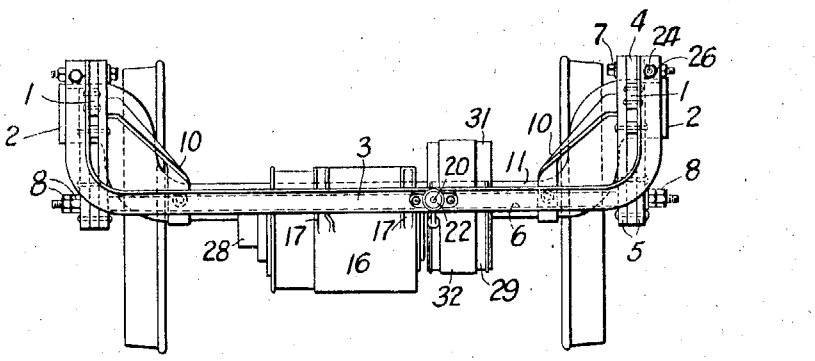

In the accompanying drawings, wherein is shown one of various possible embodiments of the invention, Figure 1 represents a plan view of the invention in connection with a car truck. Fig. 2 represents a side elevation thereof; and Fig. 3 represents a rear end elevation thereof.

The device, as shown in the drawings, is preferably attached to a car-truck which may be of any standard type. Generally speaking, the arrangement of parts as shown in the drawings is as follows:—A truck supports a fixed frame, which in turn supports a sliding frame or carriage upon which is mounted a dynamo adapted to be driven through suitable connections by an axle of the car-truck.

The fixed frame consists of projecting arms 1, preferably attached to the side sills 2 of the truck, and cross-bar 3. By this means, broadly spaced points of support are attained, the tendency to side-swinging reduced, and the general stability enhanced. The cross-bar occupies a position below the arms and its extremities are curved upwardly to meet the arms, to which they are preferably riveted. The sliding carriage, mounted on the projecting arms, comprises a pair of side bars 4 each of the side bars being adapted to bear throughout its length and to slide on one of the projecting arms. It also includes a pair of parallel depending members each of which comprises a pair of hanger links 5 situated on opposite sides of the frame and a cross-rod 6 attached at the lower portion of these hanger links. Each of the links is pivotally attached by a bolt 7 to one of the side bars at a point preferably above the projecting arms. Each cross-rod 6 passes through the oppositely disposed hanger links 5 and its ends are threaded and are secured to the hanger links by nuts 8. The cross-rods may be removed from the hanger links by unfastening these nuts. The motion of the side-bars is guided by means of plates 9 attached upon either side thereof and extending downward in such position that they straddle each of the arms.

As shown in Fig. 1, each of the hanger links consists of two upright bars which are riveted together in such manner that a space is provided therebetween, and through this space the projecting arms pass. It will be noted that any lateral thrust given to the carriage will be substantially compensated by contact of the bars of the hanger links with the projecting arms.

The projecting arms are braced to withstand vertical as well as lateral movement by means of diagonal braces 10 attached to the end sill 11 of the car-truck. As will be noted, the braces are rigidly attached to the end sill and are so secured to the movable carriage that the latter may be moved longitudinally with respect to the arms. This longitudinal movement is permitted by slots 12 formed in the guide plates 9, through which pass bolts 13 adapted to retain the carriage at any desired position with respect to the brace. The carriage is additionally secured by bolts 14 associated with slots 15, also adapted to permit longitudinal movement of the carriage. This sliding device presents many advantages in the matter of security and ready adjustability without a tendency to wedging or binding of the parts.

Mounted upon the lower cross-rods 6 is the dynamo 16 which is adjustable laterally and horizontally as hereinafter described. The dynamo is provided with lateral lugs 17 through which the cross-rods pass. The lugs are adapted to loosely support the dynamo so that it may rotate about the rods and thus maintain a substantially level position. Between each pair of lugs a collar 18 is placed which is rigidly secured to the cross-rods by bolts 19 and serves to hold the dynamo in a desired position. In order to laterally adjust the dynamo the collars are loosened and the dynamo may then be moved along the cross-rods into a given position. The horizontal adjustment of the dynamo is automatically accomplished by the oscillating motion of the links of the movable carriage, which is provided with a single tension rod 20 and spring 21 adapted to properly position the dynamo and to secure uniform tension of the belt. The tension rod is attached to the rear cross-rod, as shown, and passes through the rigid cross-bar 3 of the fixed frame (see Fig. 1). On the outside of the cross-bar one end of the spring is attached, the other end abutting a gravity nut 22, whose position is adapted to be adjusted with respect to the tension rod by means of a threaded portion upon the end of the rod. The rod and spring will tend to restrain any slight movement in the movable frame, but in order to prevent unusual swinging to and fro of the frame, incident to severe bumping together of cars or inequalities in the roadbed, chains 23 are provided which are secured to the end sill 11 of the car-truck and to the forward cross-rod.

In order to provide a means for horizontally adjusting the movable frame with respect to the arms of the fixed frame and at the same time for horizontally adjusting the position of the dynamo, a threaded bolt 24 is provided on each side of the sliding carriage which passes through a perforation 25 at either extremity of the cross-bar 3 and is held in position by lock nuts 26. The bolt also passes through and is secured to an offset portion 27 on each of the side bars. Through the operation of the lock nuts and associated parts the movable carriage may be forced backward or forward upon the arms.

As shown in the drawings, the dynamo is so positioned with respect to the cross-rods that the axis of its armature shaft 28, upon which is mounted the pulley 29, is below the line adjoining the centers of the cross-rods and is substantially in line with the center line of the car-truck axle 30, upon which is mounted the pulley 31 adapted to transmit motion to pulley 29 by belt 32. This method of positioning the dynamo insures a substantial and compact construction.

The device described is positive in its action; possesses simple parts and is well adapted to stand the wear incident to its intended location. It is, furthermore, inexpensive and may be readily assembled and disassembled.

The provision of means whereby the dynamo is maintained in a substantially level position, serves to prolong the length of life of the belt connecting the dynamo pulley and the axle pulley, for there is substantially a uniform tension upon the belt at all times, and also secures a steady supply of oil from the dynamo oil cups, which are also maintained in a level position. The means for mounting the sliding carriage and its hanger links secures the advantage that relatively long links may be used with a fixed height of dynamo and a given clearance below the lower sill of the car frame, and hence with a given swing of the generator there is a minimum elevation of its position. In other words the movement of the generator is nearly directly toward and away from the driving pulley of the axle. It is also to be especially noted that by having the pivotal portion of the supporting devices extending over the cross arms there is a far greater security of attachment as even though the bearings break, the generator would still be supported instead of being dropped on the roadbed. The sliding carriage, as shown, is easily adjustable and its side bars, bearing throughout their length upon the projecting arms minimize the tendency to bruise these projecting arms under jar and vibration. Moreover, the sliding carriage and the hanger links constructed as shown are well adapted to resist any lateral thrust or tendency of the generator to swing sidewise of the truck, and there is small liability of breakage or wear in these parts. By providing a single tension device positioned substantially opposite the dynamo pulley the tendency to bend the cross-rod is practically obviated inasmuch as the pull of the belt and the pull of the spring are substantially opposed. There is, further, little chance to pull the cross-rod out of parallelism with respect to the car-truck axle. By the use of separate lower cross-rods, the generator may be easily mounted or dismounted therefrom as for purposes of repair, and if one rod becomes bent it may be readily removed and another substituted therefor, using the same hanger links.

It will thus be seen that a simple device is provided wherein the objects of the invention are achieved.

As many changes could be made in the above construction and many apparently widely different embodiments of this invention could be made without departing from the scope thereof, it is intended that all matter contained in the above description or shown in the accompanying drawings, shall be interpreted as illustrative and not in a limiting sense.

It is also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent, is:

1. In an apparatus of the character described, in combination, a car-truck, a dynamo provided with lugs, a frame projecting from said truck, side bars adjustably mounted on said frame, links pivotally attached to each of said side bars, and cross rods removably attached to said links and passing through said lugs.

2. In an apparatus of the character described, in combination, a car-truck, a dynamo provided with lugs on opposite sides, a frame projecting from said truck, side-bars adjustably mounted on said frame, a pair of links pivotally attached to each of said side-bars, and a pair of cross rods removably attached to said links and passing through the lugs on said dynamo.

3. In an apparatus of the character described, in combination, a car-truck, a dynamo, a frame projecting from said truck, members adjustably mounted on said frame, links pivotally attached to said members, cross rods attached to said links, and means for supporting said dynamo on said cross rods in such a manner that it cannot be removed therefrom without removing said rods from said links.

4. In an apparatus of the character described, in combination, a car truck, a dynamo, a frame comprising members projecting from said truck and connected at their ends by a cross bar, side bars adjustably mounted on said projecting members, links pivotally attached to said side bars, rods detachably connected to said links, means for supporting said dynamo upon said rods, and a single tension spring attached to said cross bar and to one of said rods.

5. In an apparatus of the character described, in combination, a car truck, arms projecting therefrom, a sliding carriage mounted on said arms and adapted to support a dynamo, said carriage comprising side bars, each of said side bars being adapted to slide on one of said arms, hanger links pivotally attached to each of said side bars at a point above said arms, and cross rods attached to said hanger links and adapted to be removed therefrom.

6. In an apparatus of the character described, in combination, a car-truck, a fixed frame attached thereto comprising arms projecting from the sides of said car-truck and a cross bar connecting said arms, a movable carriage adapted to support a dynamo, said carriage being mounted on said arms and comprising side bars adapted to slide upon said arms, hanger links pivotally attached to each of said side bars at a point above said arms and cross rods attached to said hanger links and adapted to be removed therefrom, and a tension spring associated with said cross bar and said cross rod adapted to restrain the motion of said movable carriage.

7. In an apparatus of the character described, in combination, a car-truck, arms projecting therefrom, a sliding carriage mounted on said arms and adapted to support a dynamo, said carriage comprising side bars each of said side bars being adapted to bear throughout its length and to move on one of said arms, and a pair of parallel depending members, each of said members comprising a pair of hanger links and a cross rod attached to said links each of said links being pivotally attached to one of said side bars at a point above said projecting arms.

8. In apparatus of the character described, in combination, a truck, a generator, a pair of supporting arms respectively extending from each side of said truck, a pair of supporting devices each of which comprises a lower portion secured to the generator, a pair of upwardly extending parts at its ends and a pair of pivotal parts extending over said supporting arms, and means adapted to maintain said supporting devices in substantially parallel relation.

9. In apparatus of the character described, in combination, a truck, a generator, a pair of supporting arms respectively extending from the side sills of the truck and in substantial alinement therewith, a pair of supporting devices each of which comprises a lower portion secured to the generator, a pair of upwardly extending parts at its ends and a pair of pivotal portions extending over and journaled in members resting upon said arms, and means adapted to maintain said supporting devices in substantially parallel relation.

10. In apparatus of the character described, in combination, a generator, a pair of supporting arms, a pair of supporting devices each of which comprises a lower portion secured to the generator, a pair of upwardly extending parts at its ends and a pair of outwardly extending pivotal parts, members mounted upon said arms in which said pivotal parts are journaled, and securing means at the outer ends of said pivotal parts.

11. In apparatus of the character described, in combination, a pair of supporting arms, a generator, a swinging supporting device having a portion secured to said generator, upwardly extending parts at its ends and a pair of pivotal parts extending over said supporting arms, means in which the said pivotal parts have bearings mounted upon each of said arms and provided with portions extending downwardly from the said bearings and straddling said arms, said means being each slidable longitudinally of the corresponding arm, and means adapted independently to slide said bearing means and lock it in the position into which it is moved.

12. In apparatus of the character described, in combination, a generator, a pair of supporting arms, a device mounted upon each of said arms having a bearing above the arm, downwardly extending portions straddling the arm, and connecting devices for said portions, said arms each extending over and coacting with the corresponding devices to prevent upward movement thereof, means adapted to slide each of said devices independently along the corresponding arm, and a supporting device secured to said generator and extending upwardly to form pivotal connections with said bearings.

13. In apparatus of the character described, in combination, a truck, a pair of supporting arms respectively extending from each side of said truck, a slidable device mounted upon each of said arms and each provided with a pair of bearings above said arm and a pair of downwardly extending parts straddling said arm, means adapted to slide said devices along the respective arms, a generator, a pair of supporting devices for said generator secured thereto and extending upwardly at each end to form pivotal connections in said bearings, and means adapted to maintain said supporting devices in parallel relation.

14. In apparatus of the character described, in combination, a truck, a pair of supporting arms respectively extending from each side of said truck, a slidable device mounted upon each of said arms and each provided with a pair of bearings above said arm and a pair of downwardly extending parts straddling said arm, means adapted to slide said devices along the respective arms, a generator, a pair of supporting devices for said generator secured thereto and extending upwardly at each end to form pivotal connections in said bearings, means adapted to maintain said supporting devices in parallel relation, and means connecting the downwardly extending portions of each of said sliding devices to coact with said arms and prevent upward movement thereof.

15. In apparatus of the character described, in combination, a pair of supporting arms, a generator, a pair of supporting devices for said generator, a unitary device mounted on and embracing each of said arms, comprising a pair of bearing portions for said supports spaced in a longitudinal direction and means rigidly connecting said portions one with another, and means adapted independently to adjust each of said devices longitudinally of the arm on which it is mounted and lock it in adjusted position.

16. In apparatus of the character described, in combination, a pair of supporting arms, a generator, a pair of swinging supports for said generator, means adapted to maintain said supports in parallel relation, a unitary device mounted upon each of said supporting arms, each provided with a pair of bearings over the arm and rigidly formed portions depending from said bearings straddling the arm, and cross bolts connecting said depending portions of each device to co-act with said arm and prevent upward movement of the corresponding device.

17. In apparatus of the character described, in combination, a truck, a pair of supporting arms extending from the side sills of said truck and in substantial alinement therewith, a generator, a pair of supporting devices for said generator, a unitary device mounted on and embracing each of said arms comprising a pair of bearing portions for said supports spaced in a longitudinal direction and means rigidly connecting said portions one with another, and means adapted independently to adjust each of said devices longitudinally of the arm on which it is mounted and lock it in adjusted position.

18. In apparatus of the character described, in combination, a pair of supporting arms, a bearing device mounted upon each of said arms provided with a bearing portion above the arm and a pair of parallel portions straddling the arm, a generator, a pair of swinging supporting devices each of which comprises a transverse portion secured to said generator and end portions upwardly directed toward said bearings and pivotally connected therewith.

19. In apparatus of the character described, in combination, a pair of supporting arms, a bearing device mounted upon each of said arms provided with a bearing portion above the arm and a pair of parallel portions straddling the arm, a generator, a pair of swinging supporting devices each of which comprises a transverse portion secured to said generator and end portions upwardly directed toward said bearings and pivotally connected therewith, and bolts connecting the depending portions of said bearing members to co-act with said arms and prevent upward movement of said bearings.

20. In apparatus of the character described, in combination, a pair of supporting arms, a bearing device mounted upon each of said arms provided with a bearing portion above the arm and a pair of parallel portions straddling the arm, a generator, a pair of swinging supporting devices each of which comprises a transverse portion secured to said generator and end portions upwardly directed toward said bearings and pivotally connected therewith, a car truck, means adapted to drive said generator from an axle of said truck, and resilient means tending to swing said generator away from said truck, said pivotal connection comprising eyes formed in the ends of said supporting devices and bolts passing through said eyes and said bearings.

21. In apparatus of the character described, in combination, a car truck, a pair of supporting arms, a pair of devices respectively mounted upon said supporting arms and secured thereto and providing bearings above said arms, a generator driven from an axle of said truck, and supporting means for said generator, said means being secured to said generator and extending transversely therefrom and thence upwardly at each end in the form of a pair of arms each of said latter pairs of arms embracing one of said supporting arms and being pivotally connected with the corresponding bearing thereon.

22. In apparatus of the character described, in combination, a car truck, a pair of supporting arms, a pair of devices respectively mounted upon said supporting arms and secured thereto, and providing bearings above said arms, with depending portions straddling said arms and secured thereto, a generator driven from an axle of said truck, and supporting means for said generator, said means being secured to said generator and extending transversely therefrom and thence upwardly at each end in the form of a pair of arms each of said latter pairs of arms embracing one of said supporting arms and being pivotally connected with the corresponding bearing thereon.

In testimony whereof I affix my signature, this 20th day of February, 1917.

ROBERT M. DIXON.